United States Patent [19]
Uitti et al.

[11] 3,972,807
[45] Aug. 3, 1976

[54] HYDROCARBON DEASPHALTING VIA SOLVENT EXTRACTION

[75] Inventors: Kenneth D. Uitti, Bensenville; Bennie I. Bunas, Des Plaines, both of Ill.

[73] Assignee: Universal Oil Products Company, Des Plaines, Ill.

[22] Filed: June 25, 1975

[21] Appl. No.: 590,185

[52] U.S. Cl. ............................. 208/309; 208/86
[51] Int. Cl.[2] ............................................ C10G 21/14
[58] Field of Search ............................ 208/309, 86

[56] References Cited
UNITED STATES PATENTS

| | | | |
|---|---|---|---|
| 2,086,487 | 7/1937 | Bahlke et al. | 208/309 |
| 2,669,538 | 2/1954 | Yurasko et al. | 208/309 |
| 2,729,589 | 1/1956 | Waghorne et al. | 208/309 |
| 2,950,244 | 8/1960 | Lawson | 208/309 |
| 3,364,138 | 1/1968 | Campagne et al. | 208/309 |
| 3,414,506 | 12/1968 | Campagne | 208/309 |
| 3,423,308 | 1/1969 | Murphy | 208/309 |

*Primary Examiner*—Herbert Levine
*Attorney, Agent, or Firm*—James R. Hoatson, Jr.; Robert W. Erickson; William H. Page

[57] ABSTRACT

Maximum removal of asphaltic material, including high molecular weight metallic contaminants, from a hydrocarbonaceous charge stock is achieved through the utilization of a solvent extraction zone provided with direct heating facilities in an upper portion thereof. A portion of the solvent-rich hydrocarbon phase is withdrawn from the extraction zone, increased in temperature and introduced into an asphalt settling zone. The separated solvent/hydrocarbon stream, substantially asphalt-free, is reintroduced into the extraction zone at the higher temperature.

10 Claims, 1 Drawing Figure

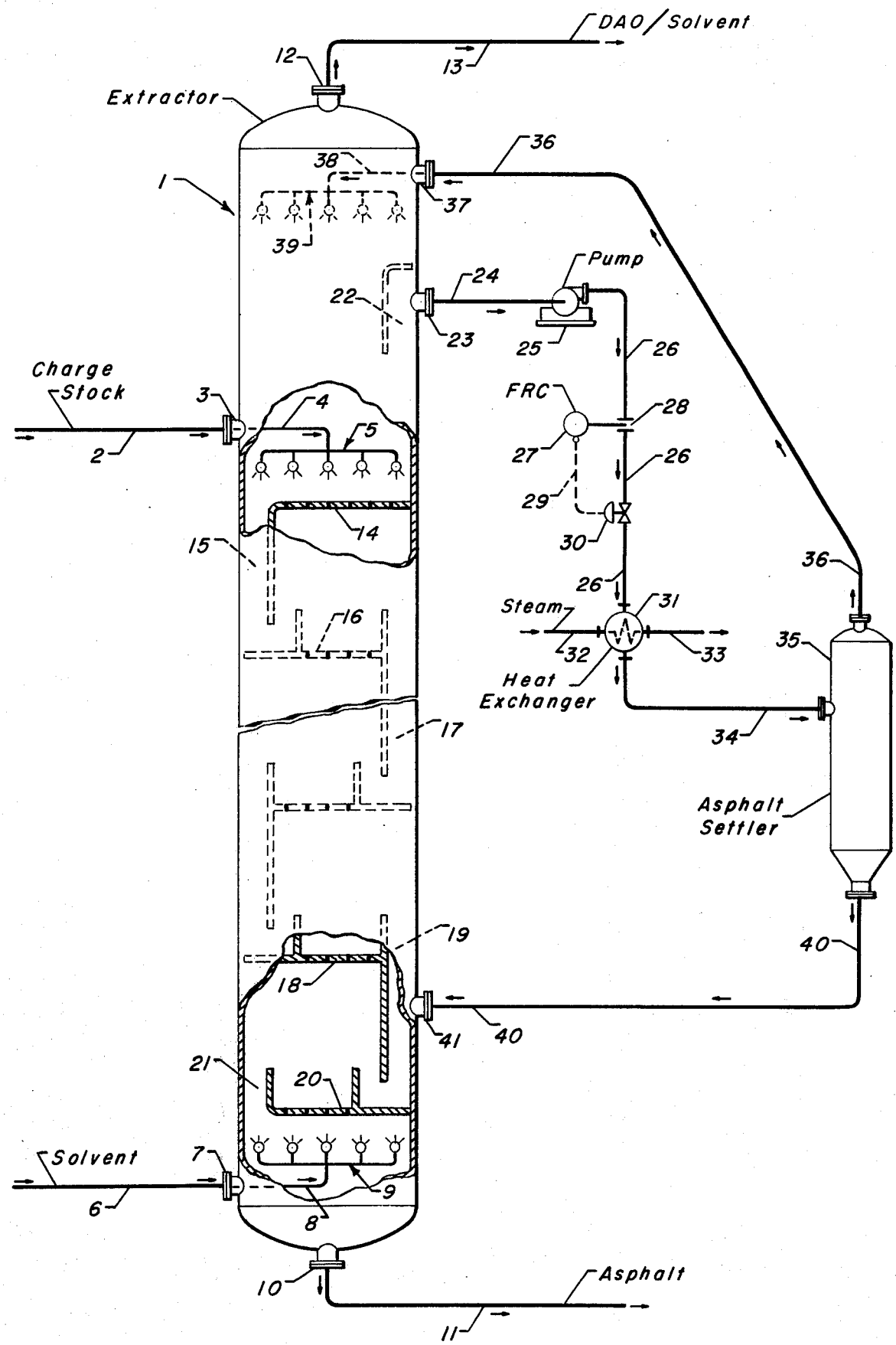

HYDROCARBON DEASPHALTING VIA SOLVENT EXTRACTION

APPLICABILITY OF INVENTION

Our invention, as herein described, is intended for utilization in the removal of hydrocarbon-insoluble asphaltenic material from hydrocarbonaceous charge stocks containing the same. More specifically, the invention is directed toward a process for deasphalting atmospheric tower bottoms, vacuum tower bottoms (vacuum residuum), crude oil residuum, topped crude oils, coal oil extract, shale oils, oils recovered from tar sands, etc., all of which have come to be referred to in the art as "black oils" and which contain varying quantities of asphaltic material.

Petroleum crude oils, particularly those heavy oils extracted from tar sands, topped or reduced crudes, vacuum residuum, contain high molecular weight sulfurous compounds in exceedingly large quantities. In addition, such black oils contain excessive quantities of nitrogenous compounds, high molecular weight organometallic complexes, principally containing nickel and vanadium, and varying quantities of asphaltenic material with which the metallic contaminants are generally associated. An abundant supply of such charge stocks exist, most of which have a specific gravity more than about 0.934 (20.0 °API). Black oils are notoriously egregious, and generally characterized, in the art, as having a boiling range indicating that at least 10.0% by volume, or more, boils above a temperature of about 1050°F.

Knowledgeable experts are currently predicting a world-wide energy crisis in the not-too-distant future. Those possessing expertise in the field of petroleum exploration, for example, are concerned with the ever-dwindling reserve supply of natural gas as compared to the ever-increasing demand therefor. As a result of legislation being imposed upon the sulfur content of liquid fuel oils, burned to meet certain energy requirements, more and more energy suppliers are looking to natural gas as a substitute. Several processes are being proposed which, it is believed, will alleviate the forthcoming critical shortage of natural gas. These generally involve the conversion of naphtha fractions, via steam reforming and shift methanation, into a "substitute" natural gas which is rich in methane. However, this in turn creates a shortage of naphtha boiling range material for utilization as motor fuel. Likewise, a shortage of kerosine boiling range fractions, principally employed as jet fuels, as well as gas oils, will stem from the necessity to convert such charge stocks to suitable automotive fuel. A multitude of factors are, therefore, contributing to the developing energy crisis. Therefore, innovative processing technology is required to insure the utilization of virtually 100% of the available petroleum crude oil charge stocks. In the petroleum refining art, this is commonly referred to as converting the "bottom of the barrel".

The deasphalting process encompassed by the present invention supplies at least some of the technology required to permit utilization of hydrocarbonaceous black oils for ultimate conversion into distillable hydrocarbons. Specific examples of those charge stocks to which the present process is applicable, include a vacuum tower bottoms having a gravity of 7.1 °API, and containing 4.05% by weight of sulfur and 23.7% by weight of asphaltics; a "topped" crude oil having a gravity of 11.0 °API, and containing 10.0% by weight of asphaltics and 5.20% by weight of sulfur; and a vacuum residuum having a gravity of about 8.8 °API, containing about 3.0% by weight of sulfur, and having a 20.0% volumetric distillation temperature of about 1055°F.

When attempting the maximum recovery of distillable hydrocarbons via the catalytic conversion of such heavy hydrocarbonaceous material, the principal difficulty encountered involves declining catalyst activity and stability resulting from the lack of suitable processing techniques which permit the severe conditions required to convert nondistillables into lower-boiling products. Catalyst instability, when processing black oil charge stocks in a fixed-bed reaction system, also stems from the presence of the asphaltenic material. This consists primarily of high-molecular weight, non-distillable coke precursors, insoluble in light hydrocarbons such as pentane or heptane, and with which are associated sulfur and metallic contaminants. The asphaltic material is dispersed within the black oil, and, when subjected to the severe operating conditions required, has the tendency to agglomerate and polymerize, as a result of which the active surfaces of the catalytic composite are effectively shielded from the material being processed. The metallic contaminants associated with the high-boiling asphaltenic fraction, also adversely affect catalyst stability and activity. In short, direct catalytic processing of hydrocarbonaceous black oils has a macabre effect on the catalytic composite. Therefore, it behooves the industry to provide continued improved technology with respect to the removal of these high-molecular weight coke precursors, while simultaneously recovering distillable hydrocarbons to the greatest possible extent.

OBJECTS AND EMBODIMENTS

A principal object of the present invention is to provide a more efficient solvent deasphalting process. A corollary objective involves the recovery of deasphalted oil (DAO) containing a lesser quantity of asphaltic material than heretofore obtained.

Another object of our invention is directed toward a solvent deasphalting unit requiring less maintenance, less initial capital investment and which will afford an extension of the effective on-stream time.

Therefore, in one embodiment, our invention is directed to a process for deasphalting an asphalt-containing hydrocarbonaceous charge stock, in a solvent extraction zone, which process comprises the steps of: (a) countercurrently contacting said charge stock, introduced into said zone through an upper first locus thereof, with a hydrocarbon-selective solvent, introduced into said zone through a lower second locus thereof, at extraction conditions selected to produce a solvent-lean asphaltic stream and a solvent-rich hydrocarbon stream; (b) withdrawing said asphaltic stream from said zone through a lower third locus below the second locus thereof, and a solvent-rich deasphalted oil from said zone through an upper fourth locus above the first locus thereof; (c) withdrawing at least a portion of said solvent-rich hydrocarbon stream from said zone through a fifth locus above the first locus thereof; (d) increasing the temperature of said portion and introducing the heated portion into a separation zone to provide a settled asphaltic phase and a solvent/hydrocarbon phase; (e) introducing said asphaltic phase into said zone through a sixth locus above the second locus thereof; and (f) introducing said solvent/hydrocarbon phase into said zone through a seventh locus intermediate the first and fifth loci thereof.

Other objects and embodiments of our invention reside in particular operating conditions and techniques, as well as preferred solvents for utilization in the extraction zone. For example, in one such other embodiment, the temperature of that portion of the solvent-rich hydrocarbon phase withdrawn through said third locus is increased from about 25°F. to about 125°F. higher than that at which it was withdrawn from the extraction zone.

PRIOR ART

It must be recognized and acknowledged that the prior art abounds with a wide spectrum of techniques utilized in the solvent deasphalting of asphaltic, hydrocarbonaceous charge stocks. In the interest of brevity, no attempt is herein made to delineate exhaustively such solvent deasphalting art. However, several illustrations of prior art deasphalting processes will be described briefly in order to show the particular area to which our invention is intended to be applied.

The broad concept of solvent deasphalting is discussed in U.S. Pat. No. 2,081,473 (Cl. 208-14). Suggested suitable solvents include light petroleum fractions, such as naphtha, casinghead gasoline and distillates which are normally vaporous at standard conditions of temperature and pressure. Preferred solvents are indicated as being liquefied normally gaseous hydrocarbon including methane, ethane, propane, butane, or mixtures thereof.

An improved deasphalting technique is described in U.S. Pat. No. 2,587,643 (Cl. 208-309) wherein the hydrocarbon solvents are utilized in admixture with a modifier comprising an organic carbonate. A similar technique is described in U.S. Pat. No. 2,882,219 (Cl. 208-86), wherein an aromatic hydrocarbon is added to the charge stock prior to subjecting the same to solvent extraction.

More recently, the integration of deasphalting with multiple-stage catalytic conversion is found in U.S. Pat. No. 3,775,292 (Cl. 208-86). Also, U.S. Pat. No. 3,830,732 (Cl. 208-309) described two-stage solvent deasphalting which initially provides a resin-and asphaltene-containing, solvent-lean hydrocarbon phase which is subjected to a second solvent deasphalting technique in order to recover a resin concentrate and to reject an asphaltic pitch.

SUMMARY OF INVENTION

When the chronological history of the art of solvent deasphalting is traced, it becomes apparent that those having the requisite expertise recognize the benefits afforded through the addition of heat to the upper section of the extraction zone (above the feed tray, or deck). This technique has the effect of increasing the quantity of precipitated asphaltic material withdrawn as the bottoms product. This so-called "top-heating" was, and continues to be, accomplished through the use, for example, of internally disposed pipes and headers (tube banks), using external high-pressure steam as the heat-exchange medium. While this indirect heating technique does increase the amount of precipitated asphalt, it is at best only partially successful — e.g., a sufficient quantity of the asphaltic material remains in the deasphalted oil (DAO) to adversely affect any catalyst employed in a subsequent catalytic conversion system. Through the use of our invention, the carryover of asphaltenic matter with the DAO is further diminished, and the recovery of the latter is significantly improved. In accordance with our inventive concept, the top-heating is accomplished directly by withdrawing a portion of the solvent-rich hydrocarbon phase from the extraction zone, through a locus above the column feed tray, and preferably above the uppermost tray, or deck therein. This stream is increased in pressure and heated to a temperature from 25°F. to about 125°F. higher than the temperature at which it was withdrawn from the extraction zone. The heated stream is introduced into an external asphalt settling zone to provide (1) a settled asphaltic phase and, (2) a substantially asphalt-free solvent/hydrocarbon phase. The externally precipitated asphalt phase is reintroduced into the extraction zone through a locus just above that through which the selected solvent is introduced. The heated solvent/hydrocarbon phase is then reintroduced into the extraction zone through a locus intermediate the locus through which the DAO/solvent overhead stream is withdrawn, and that locus through which the stream had been removed at the lower temperature. This technique is more efficient and permits more positive distribution of heat which results in a significantly better operation. In a preferred embodiment, the heated solvent/hydrocarbon phase is reintroduced in a downwardly flowing direction through suitable distribution means to provide and promote phase separation of the precipitated asphaltic material.

In accordance with the present process, the asphaltic charge stock is countercurrently contacted with a hydrocarbon-selective solvent, in a solvent extraction zone, at extraction conditions selected to produce a solvent-lean asphaltic stream and a solvent-rich hydrocarbon stream. In the present specification as well as the appended claims, the term "solvent-rich hydrocarbon stream" is intended to allude to a stream in the upper top-heating section of the extraction zone as distinguished from the deasphalted oil/solvent stream removed as an overhead product. The solvent extraction zone will function at a temperature in the range of about 50°F. to about 600°F., and preferably from about 100°F. to about 400°F.; the pressure will be maintained within the range of about 100 to about 1,000 psig., and preferably from about 200 to about 600 psig. The solvent/charge stock volumetric ratio will be in the range of about 2.0:1.0 to about 30.0:1.0, and preferably from about 3.0:1.0 to about 10.0:1.0. Judicious procedures involve the selection of temperature and pressure to maintain the extraction operations in a liquid phase.

Suitable solvents include those hereinbefore described with respect to prior art deasphalting techniques. Thus, it is contemplated that the solvent will be selected from the group of light hydrocarbons including ethane, propane, butane, isobutane, pentane, isopentane, neopentane, hexane, isohexane, heptane, the mono-olefinic counterparts thereof, etc. Furthermore, the solvent may be a normally liquid naphtha fraction containing hydrocarbons having from about 5 to about 14 carbon atoms per molecule, and preferably a naphtha distillate having an end boiling point below about 200°F. With respect to the group of light hydrocarbons containing from about 3 to about 7 carbon atoms per molecule, preferred techniques dictate the utilization of a mixture thereof. For example, suitable solvent mixtures will comprise normal butane and isopentane, propane and normal butane, normal butane and normal pentane, etc.

The asphaltic, hydrocarbonaceous charge stock is introduced into the extraction zone, through a first locus thereof, in a downwardly direction, and therein contacts an upwardly flowing solvent stream introduced through a lower second locus. A solvent-lean asphaltic stream is withdrawn from the extraction zone through a third locus in the lower portion of the extraction zone. The solvent-rich deasphalted oil stream is removed from an upper, fourth locus. The rejected asphaltic pitch will contain virtually all of the metallic contaminants originally present in the fresh feed charge stock. The sulfur content will be approximately twice that of the charge stock. A portion of the solvent-rich hydrocarbon stream is withdrawn from within the extraction zone through a fifth locus which is intermediate the first and fourth loci, and is increased in temperature at least about 25°F. to about 125°F. For example, this stream may be withdrawn at a temperature of about 227°F. and reintroduced into the extraction zone at a temperature of about 277°F. The thus-heated stream is introduced into a suitable settling zone from the bottom of which settled asphalt is reintroduced into the extraction zone through a sixth locus just above that through which the solvent is being introduced in an upwardly flowing direction. The overhead material from the settling zone, at the elevated temperature, is reintroduced into the extraction zone through a seventh locus above that locus through which it was removed originally. Additional asphaltic material, including high-boiling sulfurous compounds and the asphalt-associated metallic contaminants, is precipitated, and the recovery of DAO is increased.

As contrasted to the prior art technique of indirect top-heating through, for example, the use of tube banks, the above-described direct heating scheme provides and promotes phase separation of precipitated asphalts in the upper section of the extraction zone. Additionally, external heating requires less surface, as well as less maintenance as compared to the removal of internal coils or tube banks. Furthermore, external heating affords a much less expensive system for returning the heated stream to several locations within the top-heating section and enables the control of the heating curve. The use of external asphalt precipitation, in the settling zone, eliminates the concern over droplets of asphaltenic material being entrained in the desired DAO overhead (extract).

Other conditions and preferred operating techniques will be given in conjunction with the following description of the present process. Reference will be made to the accompanying drawing in which details such as compressors, pumps, heaters and coolers, instrumentation and controls, heat-exchange and heat-recovery circuits, valving, start-up lines and similar hardware have been eliminated, or reduced in number as being non-essential to an understanding of the present invention. The use of such miscellaneous appurtenances is directed principally to the recovery of solvent for recycle to the extraction zone, and such is well within the purview of those skilled in the art. The use thereof, to modify the present process, is within the scope and spirit of the appended claims.

DESCRIPTION OF DRAWING

For the purpose of demonstrating the illustrated embodiment, the drawing will be described in connection with the solvent extraction of a vacuum column bottoms feed stock in a commercially designed unit. It is understood that the charge stock, stream compositions, operating conditions and the like are exemplary only, and may be varied widely without departure from the spirit of my invention. The charge stock has a gravity of 8.8 °API an average molecular weight of about 620 and is processed in an amount of about 20,100 Bbl./day. The hydrocarbon-selective solvent is a 50/50 volumetric mixture of normal butane and isopentane, and the solvent to charge stock volumetric ratio is 5.0:1.0.

With reference now to the drawing, there is illustrated, in a partially sectioned view, an extraction column 1 having disposed therein a series of decks, or trays shown as 14, 16, 18 and 20, equipped with downcomers 15, 17, 19 and 21. Generally, the design of the extractor internals, and particularly the decks, will be selected on the basis of charge stock characteristics, the hydrocarbon-selective solvent and the desired recovery of DAO. We prefer the utilization of the countercurrent jet trays as illustrated so that the dispersed phase is both known and controlled. These provide a definitive dispersal of the phase having the higher flow rate — i.e., the selected solvent — and a greater number of theoretical trays is possible. This, in turn, leads to higher DAO yields, lower asphaltenic content thereof and a lower solvent rate.

The charge stock in the amount of 477.05 moles/hr., admixed with about 548.84 moles/hr. of the hydrocarbon-selective solvent, is introduced into extraction zone 1 via line 2 and inlet port 3 (first locus). The combined feed enters the column by way of line 4 at a temperature of about 235°F. and a pressure of about 370 psig., and is directed downwardly by way of distribution means 5. Generally, the combined feed will be introduced above one of the top five trays, or decks in the extraction zone. We prefer to introduce the black oil charge stock into the lower part of the top-heating section, or just above perforated tray 14 which is provided with downcomer 15. The solvent mixture of isopentane and normal butane, in the amount of about 13,171.94 moles/hr., is introduced through line 6 and inlet port 7 (second locus), and is directed in an upwardly direction by way of line 8 and distributing means 9, at a temperature of about 225°F. and a pressure of about 372 psig. In general, the solvent mixture is introduced into the extraction zone below the lowermost tray, or deck, illustrated as 20.

The precipitated asphalt phase is withdrawn from the bottom of the extraction zone through outlet port 10 (third locus) and line 11, at a temperature of 230°F. and a pressure of about 372 psig., and consists of 74.66 moles/hr. of asphaltenic material, about 179.28 moles/hr. of normal butane and about 154.43 moles/hr. of isopentane. This stream is transported to a suitable solvent recovery system from which the solvent is recycled to the extraction zone. Deasphalted oil, in the amount of 402.29 moles/hr., 7,191.99 moles/hr. of normal butane and 6,195.08 moles/hr. of isopentane are removed through outlet port 12 (fourth locus) and line 13, at a temperature of about 275°F. and a pressure of about 352 psig. This material is also transported to a solvent recovery facility from which the solvent is recycled to the extraction zone.

About 13,809.0 moles/hr. of the upwardly flowing solvent-rich hydrocarbon phase is withdrawn from draw-off baffle 22 through outlet port 23 (fifth locus) and line 24, at a temperature of about 225°F., and introduced thereby into pump 25. The latter discharges via line 26 containing orifice plate 28 and Flow Recorder Controller (FRC) 27. The latter adjusts control valve 30 via instrument line 29 in response to the flow rate signal received from orifice plate 28, and the solvent-rich hydrocarbon phase continues through line 26 into heat-exchanger 31. In this illustration, high-pressure steam from line 32 serves as the heat-exchange medium, and exits heat-exchanger 31 via line 33. The heated material, at a temperature of about 278°F., passes through line 34 into asphalt settler 35. Asphaltenic material settles into a lower phase which is withdrawn through line 40 and introduced through inlet port 41 (sixth locus) into downcomer 19 which is part of jet tray 18. The precipitated asphalts flow over the weirs of tray 20, into downcomer 21 and are removed from the extraction zone through outlet port 10 and line 11. The substantially asphalt-free solvent/hydrocarbon phase is introduced, via line 36, into the extraction zone through inlet port 37 (seventh locus) at a temperature of about 275°F. and a pressure of about 352 psig., and discharged downwardly through line 38 and distributing means 39.

From the foregoing, it will be recognized that this solvent extraction process is effected in a stage-wise, countercurrent fashion. The use therein of the jet trays provides for definitive phase dispersion and the phases are not competing for the same space. Precipitated asphaltenic material flows downwardly through, for example, downcomer 15, contacts upwardly flowing solvent/hydrocarbon phase on tray 16, and flows downwardly through downcomer 17 to the tray below. Through the use of the external settler, entrainment of asphaltic material in the DAO is virtually completely eliminated. The deasphalted oil, recovered in an amount of about 85.6 volume percent, will contain less than about 0.01% by weight of asphaltenic material.

We claim as our invention:

1. A process for deasphalting an asphalt-containing hydrocarbonaceous charge stock, in a solvent extraction zone, which process comprises the steps of:
   a. countercurrently contacting said charge stock, introduced into said zone through an upper first locus thereof, with a hydrocarbon-selective solvent, introduced into said zone through a lower second locus thereof, at extraction conditions selected to produce a solvent-lean asphaltic stream and a solvent-rich hydrocarbon stream;
   b. withdrawing said asphaltic stream from said zone through a lower third locus below the second locus thereof, and a solvent-rich deasphalted oil from said zone through an upper fourth locus above the first locus thereof;
   c. withdrawing at least a portion of said solvent-rich hydrocarbon stream from said zone through a fifth locus above the first locus thereof;
   d. increasing the temperature of said portion and introducing the heated portion into a separation zone to provide a settled asphaltic phase and a solvent/hydrocarbon phase;
   e. introducing said asphaltic phase into said zone through a sixth locus above the second locus thereof; and,
   f. introducing said solvent/hydrocarbon phase into said zone through a seventh locus intermediate the first and fifth loci thereof.

2. The process of claim 1 further characterized in that said solvent/hydrocarbon phase is introduced through said seventh locus in a downwardly direction.

3. The process of claim 1 further characterized in that said extraction conditions include temperatures in the range of about 50°F. to about 600°F., pressures from about 100 to about 1,000 psig. and a solvent/charge stock volumetric ratio in the range of about 2.0:1.0 to about 30.0:1.0.

4. The process of claim 1 further characterized in that the temperature of the solvent-rich hydrocarbon stream withdrawn through said fifth locus is increased about 25°F. to about 125°F.

5. The process of claim 1 further characterized in that said solvent comprises a light hydrocarbon containing from about 3 to about 7 carbon atoms per molecule.

6. The process of claim 1 further characterized in that said solvent comprises a normally liquid naphtha fraction having an end boiling point below about 200°F.

7. The process of claim 5 further characterized in that said solvent comprises a mixture of normal butane and isopentane.

8. The process of claim 5 further characterized in that said solvent comprises a mixture of propane and normal butane.

9. The process of claim 5 further characterized in that said solvent is isopentane.

10. The process of claim 5 further characterized in that said solvent comprises a mixture of propane and isobutane.

\* \* \* \* \*